US012172471B2

(12) United States Patent
Hayashi

(10) Patent No.: US 12,172,471 B2
(45) Date of Patent: Dec. 24, 2024

(54) TIRE

(71) Applicant: The Yokohama Rubber Co., LTD., Tokyo (JP)

(72) Inventor: Daisen Hayashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 103 days.

(21) Appl. No.: 17/448,596

(22) Filed: Sep. 23, 2021

(65) Prior Publication Data

US 2022/0097461 A1    Mar. 31, 2022

(30) Foreign Application Priority Data

Sep. 30, 2020    (JP) .................................. 2020-164582

(51) Int. Cl.
  *B60C 11/13*    (2006.01)
  *B60C 11/03*    (2006.01)
  *B60C 11/12*    (2006.01)

(52) U.S. Cl.
  CPC ...... *B60C 11/1392* (2013.01); *B60C 11/1384* (2013.01); *B60C 2011/0346* (2013.01); *B60C 2011/0348* (2013.01); *B60C 2011/0388* (2013.01); *B60C 2011/1213* (2013.01); *B60C 2200/06* (2013.01)

(58) Field of Classification Search
  CPC . B60C 11/1384; B60C 11/1392; B60C 11/13; B60C 2200/06; B60C 11/1376; B60C 11/11; B60C 2011/0372
  See application file for complete search history.

(56) References Cited

U.S. PATENT DOCUMENTS 6,983,777 B2    1/2006 Ratliff, Jr.
2016/0082279 A1*    3/2016 Andersen ........... A61K 48/0075
                                                                    607/92

(Continued)

FOREIGN PATENT DOCUMENTS

CA    2256914 A    6/1999
JP    H1120414 A    1/1999

(Continued)

OTHER PUBLICATIONS

JP 2009-006870 Machine Translation; Itakura, Keisuke (Year: 2009).*

(Continued)

*Primary Examiner* — Katelyn W Smith
*Assistant Examiner* — Nicholas J Weiler
(74) *Attorney, Agent, or Firm* — Thorpe North & Western

(57) ABSTRACT

A tire includes a circumferential narrow groove disposed in a tread portion center region and having a groove width of 0.5 mm or more and 3.0 mm or less, and a first land portion defined by the circumferential narrow groove and a second land portion located further on a tire equatorial plane side than the first land portion and adjacent to the first land portion. Additionally, the first and second land portions include chamfered portions, respectively in edge portions on the circumferential narrow groove side. Additionally, a circumferential length L33 of the chamfered portion of the second land portion has the relationship L33<L24 with respect to a circumferential length L24 of the chamfered portion of the first land portion.

22 Claims, 9 Drawing Sheets

(56) References Cited

U.S. PATENT DOCUMENTS

| | | | |
|---|---|---|---|
| 2016/0159158 A1* | 6/2016 | Washizuka | B60C 11/1236 |
| | | | 152/209.8 |
| 2016/0272010 A1* | 9/2016 | Washizuka | B60C 11/033 |
| 2016/0297254 A1* | 10/2016 | Numata | B60C 11/1236 |
| 2017/0190220 A1* | 7/2017 | Ishibashi | B60C 11/0302 |
| 2018/0370290 A1* | 12/2018 | Hirosue | B60C 11/1263 |
| 2019/0202242 A1* | 7/2019 | Kagimoto | B60C 11/1307 |
| 2020/0247191 A1* | 8/2020 | Nakajima | B60C 11/0306 |
| 2021/0339573 A1* | 11/2021 | Sato | B60C 11/1384 |

FOREIGN PATENT DOCUMENTS

| | | | |
|---|---|---|---|
| JP | H11189013 A | | 7/1999 |
| JP | 2009006870 A | * | 1/2009 |
| JP | 2009006877 A | | 1/2009 |
| JP | 5498466 B2 | | 5/2014 |
| JP | 2014162429 A | | 9/2014 |
| JP | 5886816 B2 | | 3/2016 |
| JP | 2018065523 A | * | 4/2018 |

OTHER PUBLICATIONS

JP 2018-065523 Machine Translation; Honda, Toshihiko (Year: 2018).*

* cited by examiner

| | Comparative Example | Example 1 | Example 2 | Example 3 | Example 4 | Example 5 | Example 6 | Example 7 | Example 8 |
|---|---|---|---|---|---|---|---|---|---|
| Chamfered portion of circumferential narrow groove | No | Yes | Yes | Yes | Yes | Yes | Yes | Yes | Yes |
| L24/Ps | - | 0.99 | 0.97 | 0.97 | 0.97 | 0.97 | 0.97 | 0.97 | 0.97 |
| L33/Ps | - | 0.79 | 0.63 | 0.49 | 0.34 | 0.29 | 0.29 | 0.29 | 0.29 |
| L33/L24 | - | 0.80 | 0.65 | 0.50 | 0.35 | 0.30 | 0.30 | 0.30 | 0.30 |
| Ld/Ps | - | 0.78 | 0.60 | 0.46 | 0.31 | 0.26 | 0.26 | 0.26 | 0.26 |
| W24/Wb2 | - | 0.10 | 0.10 | 0.10 | 0.10 | 0.10 | 0.10 | 0.10 | 0.10 |
| W33/Wb3 | - | 0.05 | 0.05 | 0.05 | 0.05 | 0.05 | 0.05 | 0.12 | 0.12 |
| H24/Hs | - | 0.20 | 0.20 | 0.20 | 0.20 | 0.20 | 0.20 | 0.35 | 0.60 |
| H33/H24 | - | 0.70 | 0.70 | 0.70 | 0.70 | 0.70 | 0.70 | 0.70 | 0.70 |
| Shape of circumferential narrow groove | Zigzag | Zigzag | Zigzag | Zigzag | Zigzag | Zigzag | Zigzag | Zigzag | Zigzag |
| Ls/Ps | 0.50 | 0.50 | 0.50 | 0.50 | 0.50 | 0.50 | 0.50 | 0.50 | 0.50 |
| Ws [mm] | 2.0 | 2.0 | 2.0 | 2.0 | 2.0 | 2.0 | 2.0 | 2.0 | 2.0 |
| Ws/Wm | 0.35 | 0.35 | 0.35 | 0.35 | 0.35 | 0.35 | 0.35 | 0.35 | 0.35 |
| As/Wb2 | 0.60 | 0.60 | 0.60 | 0.60 | 0.60 | 0.60 | 0.60 | 0.60 | 0.60 |
| W21 [mm] | 1.2 | 1.2 | 1.2 | 1.2 | 1.2 | 4.0 | 9.0 | 9.0 | 9.0 |
| W23 [mm] | 1.2 | 1.2 | 1.2 | 1.2 | 1.2 | 1.2 | 1.2 | 1.2 | 1.2 |
| W31 [mm] | 1.2 | 1.2 | 1.2 | 1.2 | 1.2 | 1.2 | 1.2 | 1.2 | 1.2 |
| W32 [mm] | 1.2 | 1.2 | 1.2 | 1.2 | 1.2 | 1.2 | 1.2 | 1.2 | 1.2 |
| Low rolling resistance performance | 100 | 100 | 100 | 100 | 100 | 102 | 100 | 100 | 100 |
| Uneven wear resistance performance | 100 | 101 | 102 | 101 | 101 | 103 | 102 | 102 | 102 |
| Wet braking performance | 100 | 101 | 102 | 102 | 102 | 103 | 103 | 104 | 105 |

FIG. 8

|  | Example 9 | Example 10 | Example 11 | Example 12 | Example 13 | Example 14 | Example 15 | Example 16 |
|---|---|---|---|---|---|---|---|---|
| Chamfered portion of circumferential narrow groove | Yes | Yes | Yes | Yes | Yes | Yes | Yes | Yes |
| L24/Ps | 0.97 | 0.97 | 0.97 | 0.97 | 0.97 | 0.97 | 0.97 | 0.97 |
| L33/Ps | 0.29 | 0.29 | 0.29 | 0.29 | 0.29 | 0.29 | 0.29 | 0.29 |
| L33/L24 | 0.30 | 0.30 | 0.30 | 0.30 | 0.30 | 0.30 | 0.30 | 0.30 |
| Ld/Ps | 0.26 | 0.26 | 0.26 | 0.26 | 0.26 | 0.26 | 0.26 | 0.26 |
| W24/Wb2 | 0.10 | 0.10 | 0.10 | 0.10 | 0.10 | 0.10 | 0.10 | 0.10 |
| W33/Wb3 | 0.12 | 0.12 | 0.12 | 0.12 | 0.12 | 0.12 | 0.12 | 0.12 |
| H24/Hs | 0.60 | 0.60 | 0.60 | 0.60 | 0.60 | 0.60 | 0.60 | 0.60 |
| H33/H24 | 1.00 | 1.00 | 1.00 | 1.00 | 1.00 | 1.00 | 1.00 | 1.00 |
| Shape of circumferential narrow groove | Zigzag | Zigzag | Zigzag | Zigzag | Zigzag | Zigzag | Zigzag | Zigzag |
| Ls/Ps | 0.50 | 0.85 | 0.95 | 0.95 | 0.95 | 0.95 | 0.95 | 0.95 |
| Ws [mm] | 2.0 | 2.0 | 2.0 | 2.0 | 2.0 | 2.0 | 2.0 | 2.0 |
| Ws/Wm | 0.35 | 0.35 | 0.35 | 0.16 | 0.16 | 0.16 | 0.16 | 0.16 |
| As/Wb2 | 0.60 | 0.60 | 0.60 | 0.60 | 0.40 | 0.18 | 0.18 | 0.18 |
| W21 [mm] | 9.0 | 9.0 | 9.0 | 9.0 | 9.0 | 9.0 | 9.0 | 9.0 |
| W23 [mm] | 1.2 | 1.2 | 1.2 | 1.2 | 1.2 | 1.2 | 0.7 | 0.7 |
| W31 [mm] | 1.2 | 1.2 | 1.2 | 1.2 | 1.2 | 1.2 | 1.2 | 0.7 |
| W32 [mm] | 1.2 | 1.2 | 1.2 | 1.2 | 1.2 | 1.2 | 0.7 | 0.7 |
| Low rolling resistance performance | 100 | 101 | 101 | 103 | 104 | 104 | 106 | 107 |
| Uneven wear resistance performance | 103 | 103 | 103 | 103 | 105 | 106 | 108 | 110 |
| Wet braking performance | 105 | 105 | 106 | 106 | 106 | 106 | 106 | 106 |

FIG. 9

TIRE

CROSS-REFERENCE TO RELATED APPLICATIONS

This application claims priority pursuant to 35 U.S.C. 119(a) to Japanese Patent Application No. 2020-164582, filed Sep. 30, 2020, which application is incorporated herein by reference in its entirety.

TECHNICAL FIELD

The technology relates to a tire and particularly relates to a tire that can provide low rolling resistance performance, uneven wear resistance performance, and wet braking performance of the tire in a compatible manner.

BACKGROUND ART

In a heavy duty tire in recent years, there is a demand for improving the wet braking performance of the tire while reducing the rolling resistance of the tire. Technology described in Japan Patent Nos. 5886816 and 5498466 is known as a pneumatic tire in the related art that addresses such a demand.

SUMMARY

The technology provides a tire that can provide the low rolling resistance performance, uneven wear resistance performance, and wet braking performance of the tire in a compatible manner.

A tire according to an embodiment of the technology includes a circumferential narrow groove disposed in a tread portion center region and having a groove width of 0.5 mm or more and 3.0 mm or less, and a first land portion defined by the circumferential narrow groove and a second land portion located further on a tire equatorial plane side than the first land portion and adjacent to the first land portion. Each of the first land portion and the second land portion includes a chamfered portion in an edge portion on the circumferential narrow groove side, and a circumferential length L33 of the chamfered portion of the second land portion has the relationship L33<L24 with respect to a circumferential length L24 of the chamfered portion of the first land portion.

In a tire according to an embodiment of the technology, (1) the tire includes a circumferential narrow groove in a tread portion center region, and thus, as compared with a configuration in which a main groove is provided instead of the circumferential narrow groove, the groove area of the tread portion center region is reduced. Accordingly, this is advantageous in that the rigidity of the tread portion center region increases, and the rolling resistance of the tire is reduced, and additionally, the uneven wear resistance performance of the tire improves. Additionally, (2) each of a first land portion and a second land portion includes a chamfered portion in an edge portion on a circumferential narrow groove side, and thus, this is advantageous in that the groove volume of the circumferential narrow groove is enlarged by the chamfered portion, and the wet braking performance of the tire improves. Further, (3) a circumferential length L33 of the chamfered portion of the second land portion on a tire equatorial plane side is shorter than a circumferential length L24 of the chamfered portion of the first land portion on a tire ground contact edge side (L33<L24), and thus, this is advantageous in that, as compared with a configuration in which both the chamfered portions have an identical circumferential length, the rigidity of the second land portion is ensured, and the rolling resistance of the tire is reduced, and additionally, the uneven wear of a center land portion is suppressed.

BRIEF DESCRIPTION OF DRAWINGS

FIG. 8 is a table showing the results of performance tests of tires according to embodiments of the technology.

FIG. 9 is a table showing the results of performance tests of tires according to embodiments of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
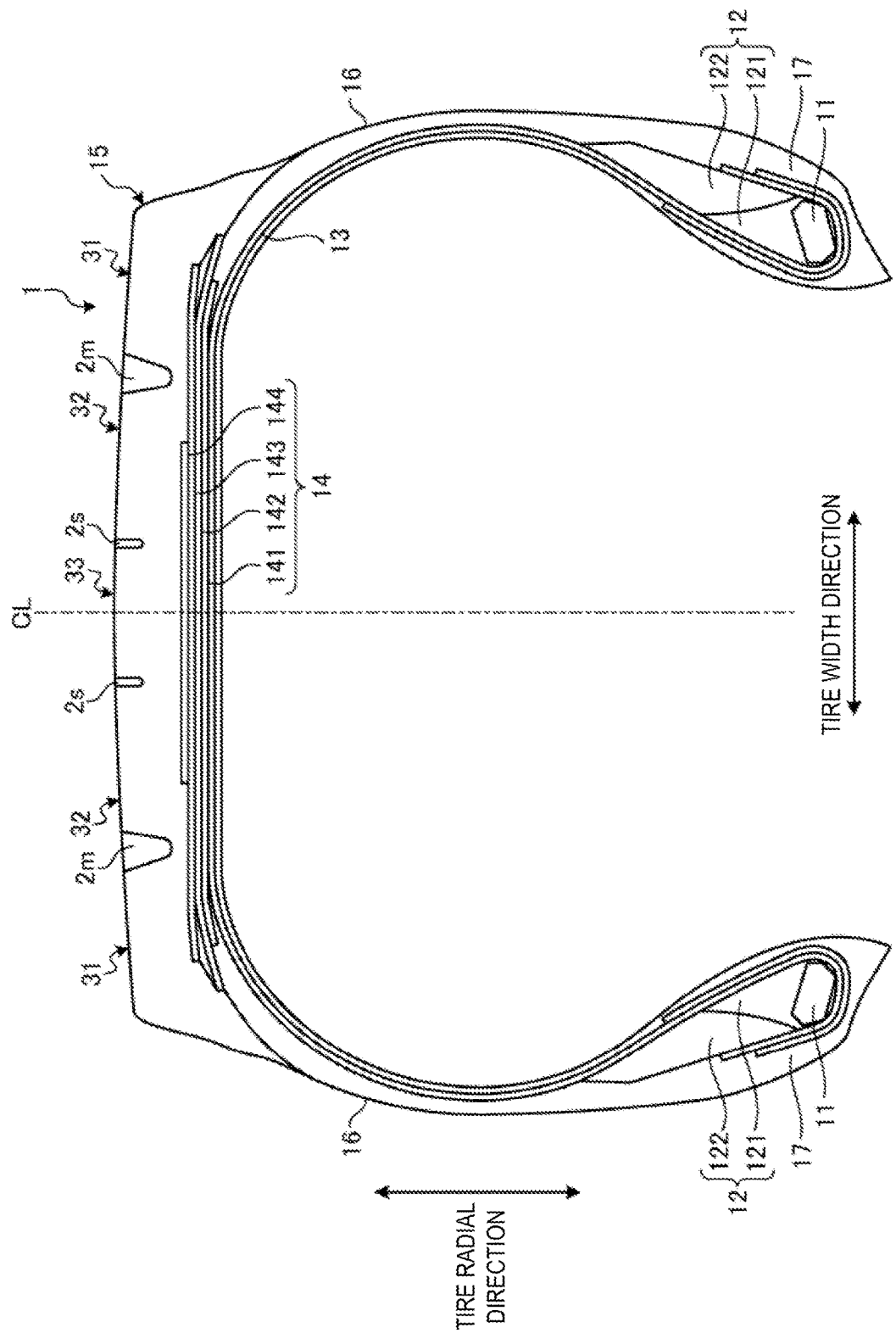
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. Additionally, in the embodiment, a heavy duty pneumatic radial tire mounted on a drive shaft of a tractor head will be described as an example of the tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are each made of a lower filler 121 and an upper filler 122. The pair of bead fillers 12, 12 are disposed in outer circumferences in the tire radial direction of the pair of bead cores 11, 11, respectively, and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. Additionally, the carcass ply of the carcass layer 13 is constituted by covering, with coating rubber, a plurality of carcass cords made of steel and by performing a rolling process on the carcass cords. The carcass ply of the carcass layer 13 has a cord angle (defined as an inclination angle in a longitudinal direction of the carcass cords with respect to a tire circumferential direction) of 80 degrees or more and 90 degrees or less as an absolute value for a radial tire and 30 degrees or more and 45 degrees or less for a bias tire.

The belt layer 14 is made of a plurality of belt plies 141 to 144 being layered, and is disposed by being wound around an outer circumference of the carcass layer 13. These belt plies 141 to 144 include, for example, a large-angle belt 141, a pair of cross belts 142 and 143, and a belt cover 144. The large-angle belt 141 is constituted by covering, with coating rubber, a plurality of belt cords made of steel and by performing a rolling process on the belt cords. The large-angle belt 141 has a cord angle (defined as an inclination angle in a longitudinal direction of the belt cords with respect to the tire circumferential direction) of 45 degrees or more and 70 degrees or less as an absolute value. The pair of cross belts 142, 143 are each constituted by covering, with coating rubber, a plurality of belt cords made of steel and by performing a rolling process on the belt cords. Each of the pair of cross belts 142, 143 has a cord angle of 10 degrees or more and 55 degrees or less as an absolute value. Additionally, the pair of cross belts 142, 143 have cord angles having mutually opposite signs, and the pair of cross belts 142, 143 are layered by making the belt cords mutually intersect in the longitudinal direction of the belt cords (a so-called crossply structure is formed). The belt cover 144 is constituted by covering, with coating rubber, a plurality of belt cords made of steel or an organic fiber material and by performing a rolling process on the belt cords. The belt cover 144 has a cord angle of 10 degrees or more and 55 degrees or less as an absolute value.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right, and turned back portions of the carcass layer 13 toward the outer side in the tire width direction, and constitute rim fitting surfaces of the bead portions.

Tread Surface

Figure 2:
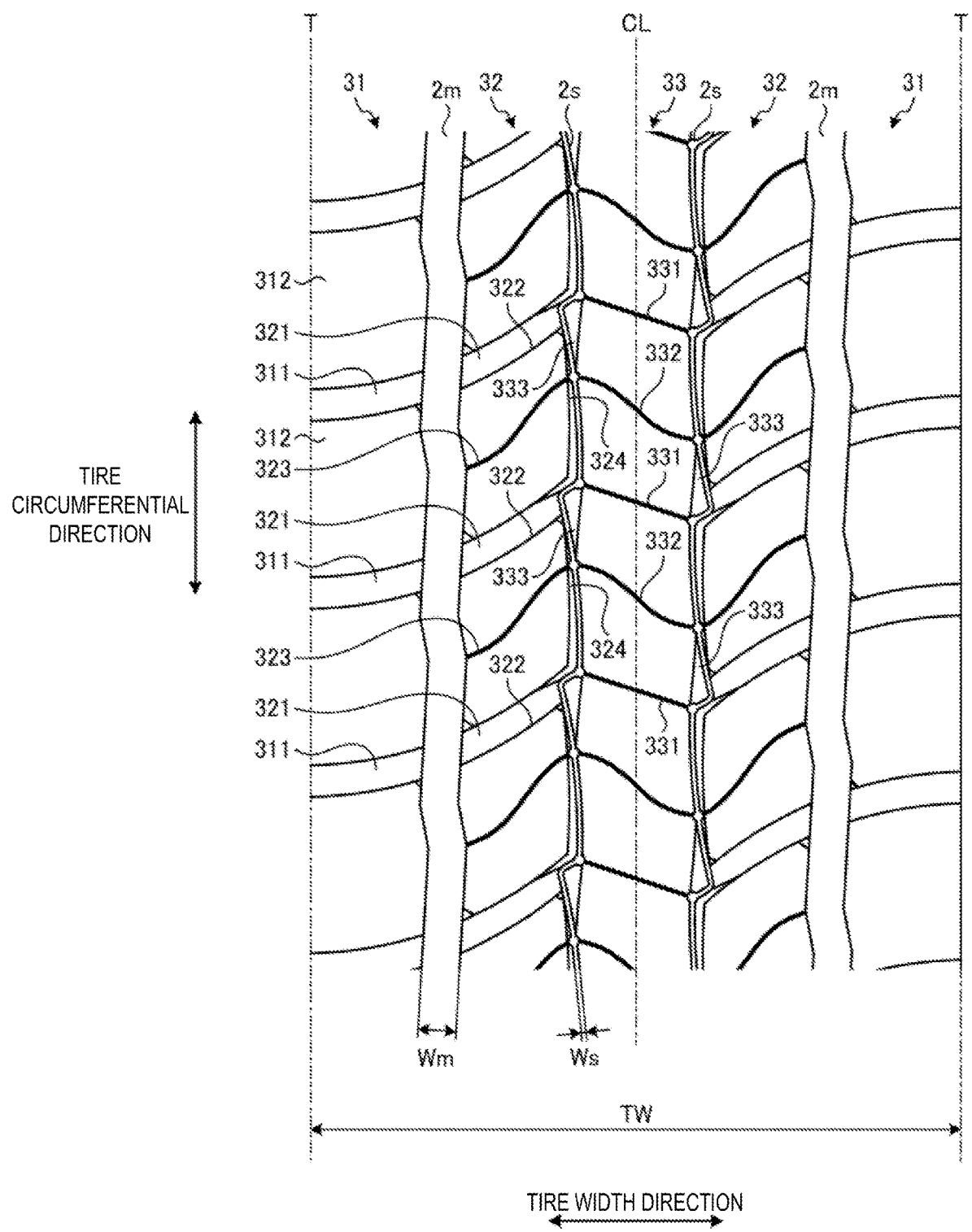
FIG. 2 is a plan view illustrating a tread surface of the tire illustrated in FIG. 1.

FIG. 2 is a plan view illustrating a tread surface of the tire 1 illustrated in FIG. 1. The same drawing illustrates a tread surface of an all-season tire. In the same drawing, "tire circumferential direction" refers to the direction about the tire rotation axis. Additionally, reference sign T denotes a tire ground contact edge, and dimension symbol TW denotes a tire ground contact width. Additionally, in the same drawing, the tire 1 includes a tread surface that is substantially point symmetric, and thus a portion of reference signs of constituents in a region on the right side in the drawing is omitted.

As illustrated in FIG. 2, the tire 1 includes, in the tread surface, a pair of shoulder main grooves 2m, 2m extending in the tire circumferential direction, two or more circumferential narrow grooves 2s disposed between these shoulder main grooves 2m, 2m and extending in the tire circumferential direction, a pair of shoulder land portions 31, 31, a pair of middle land portions 32, 32 and one or more rows of center land portions 33, and the pair of shoulder land portions 31, 31, the pair of middle land portions 32, 32 and the one or more rows of center land portions 33 are defined and formed by these shoulder main grooves 2m and these circumferential narrow grooves 2s. The middle land portion 32 is defined as a land portion defined and formed by the shoulder main groove 2m and the circumferential narrow groove 2s that is located closest to the tire ground contact edge T side. The center land portion 33 is defined as a land portion adjacent to the middle land portion 32. Additionally, a region between the pair of shoulder main grooves 2m, 2m (defined as a tread portion center region) does not include other circumferential grooves having a maximum groove width exceeding 3.0 mm. Thus, a single ground contact region including a substantially continuous road contact surface is formed in the tread portion center region. Accordingly, the rigidity of the tread portion center region is ensured, and the rolling resistance of the tire is reduced.

The shoulder main groove 2m is a groove that is obliged to display a wear indicator specified by JATMA, and has a maximum groove width Wm of 5.0 mm or more and a maximum groove depth Hm (see FIG. 5) of 10 mm or more. Additionally, the circumferential narrow grooves 2s, 2s each have a groove width Ws of 0.5 mm or more and 3.0 mm or less and additionally, a maximum groove depth Hs (see FIG. 5) of 8.0 mm or more. Additionally, the groove width Ws of each of the circumferential narrow grooves 2s, 2s is in the range Ws/Wm≤0.30 with respect to the groove width Wm of the shoulder main groove 2m. Note that the details of the circumferential narrow grooves 2s, 2s will be described below.

The groove width is measured as a distance between groove walls opposed to each other in a groove opening portion when the tire is mounted on a specified rim, inflated to a specified internal pressure, and in an unloaded state. In a configuration in which the groove opening portion includes a notch portion or a chamfered portion, the groove width is measured by using, as end points, intersection points of an extension line of a tread contact surface and extension lines of the groove walls, in a cross-sectional view parallel to a groove width direction and a groove depth direction.

The groove depth is measured as a distance from the tread contact surface to a groove bottom when the tire is mounted on a specified rim, inflated to a specified internal pressure, and in an unloaded state. Additionally, in a configuration in which the groove bottom includes a partial recess/protrusion portion or a sipe, the groove depth is measured excluding these portions.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO. However, in JATMA, in the case of a tire for a passenger vehicle, the specified internal pressure is an air pressure of 180 kPa, and the specified load is 88% of the maximum load capacity at the specified internal pressure.

For example, in the configuration of FIG. 2, the tire 1 includes a tread pattern that is substantially point symmetric and that includes a center point on the tire equatorial plane CL. However, no such limitation is intended, and, for example, the tire 1 may include an axisymmetric tread pattern or a left-right asymmetric tread pattern with the tire equatorial plane CL being as the center, or may include a tread pattern having directionality in a tire rotation direction (not illustrated).

Additionally, in the configuration of FIG. 2, each of left and right regions demarcated by the tire equatorial plane CL includes one of the shoulder main grooves 2m, 2m. Additionally, the two circumferential narrow grooves 2s, 2s are disposed between these shoulder main grooves 2m, 2m. Additionally, the pair of shoulder land portions 31, 31, the pair of middle land portions 32, 32, and the single center land portion 33 are defined by these shoulder main grooves 2m, 2m and these circumferential narrow grooves 2s, 2s. Additionally, the center land portion 33 is located on the tire equatorial plane CL.

However, no such limitation is intended, and three or more circumferential narrow grooves 2s may be disposed between the pair of shoulder main grooves 2m, 2m (not illustrated). In this case, the pair of shoulder land portions 31, 31, the pair of middle land portions 32, 32, and two or more rows of the center land portions 33 are defined.

Tread Portion Center Region

Figure 3:
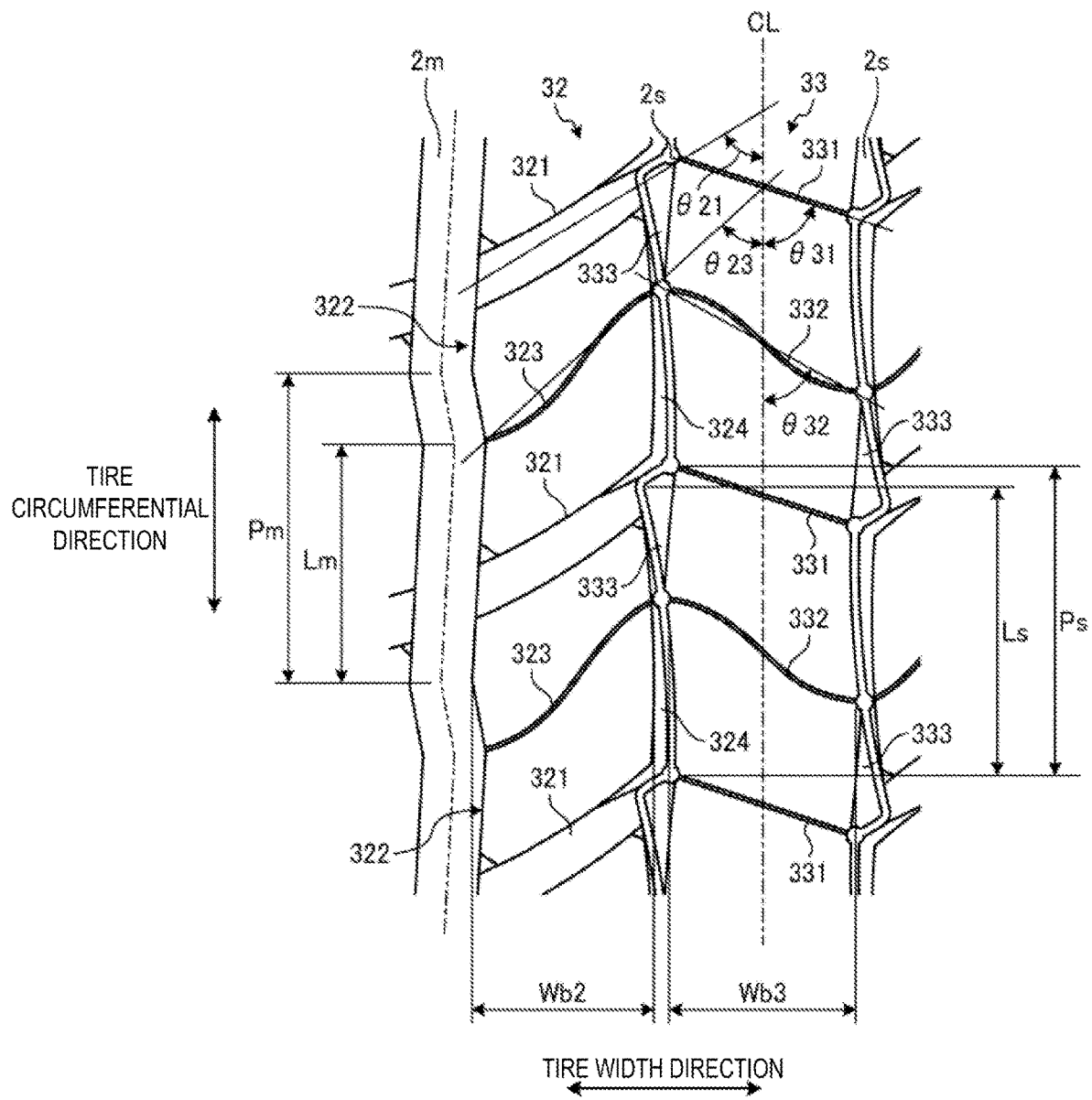
FIG. 3 is an enlarged view illustrating the tread surface of the tire illustrated in FIG. 2.
Figure 4:
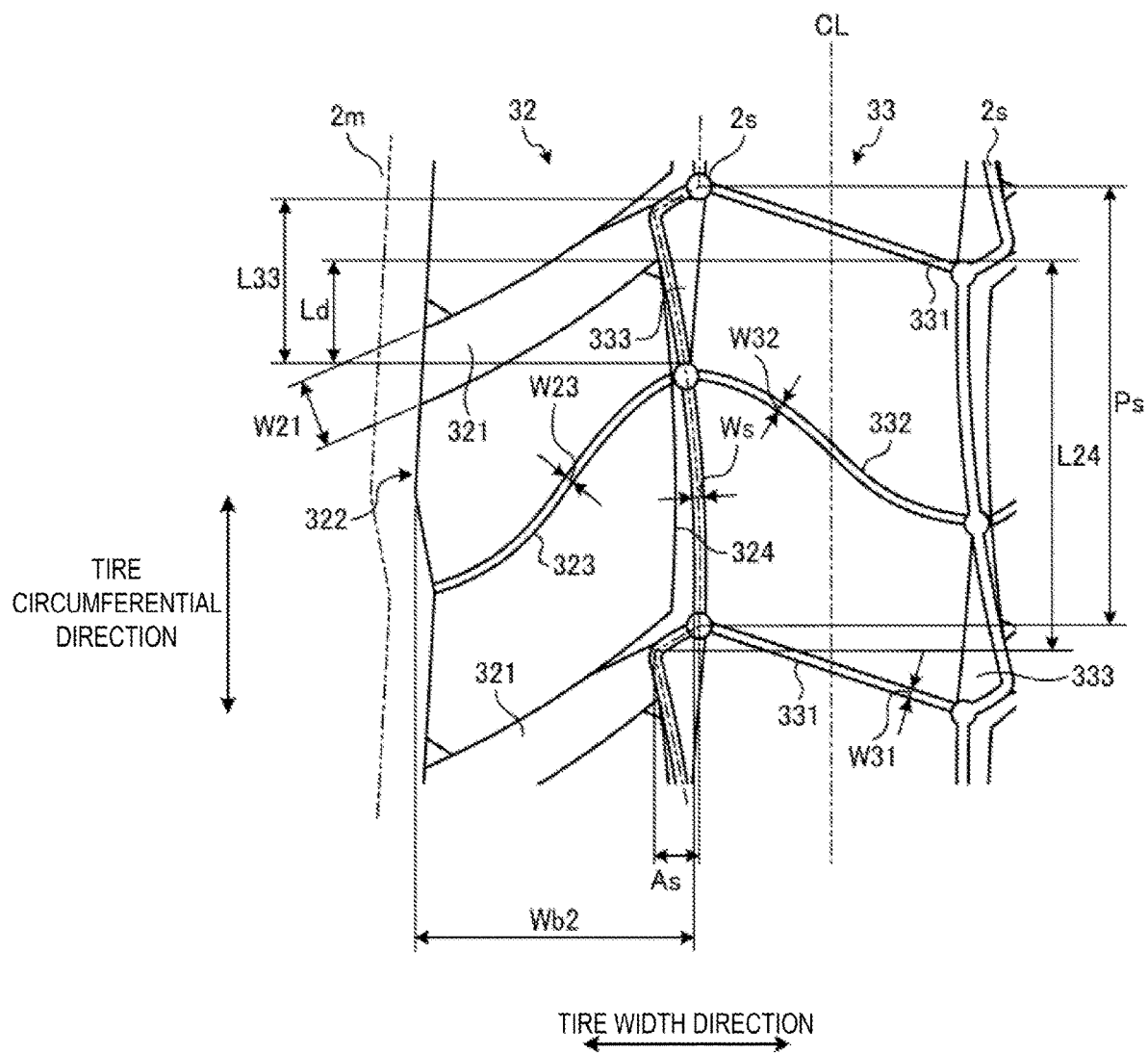
FIG. 4 is an enlarged view illustrating a middle land portion and a center land portion that are illustrated in FIG. 3.
Figure 5:
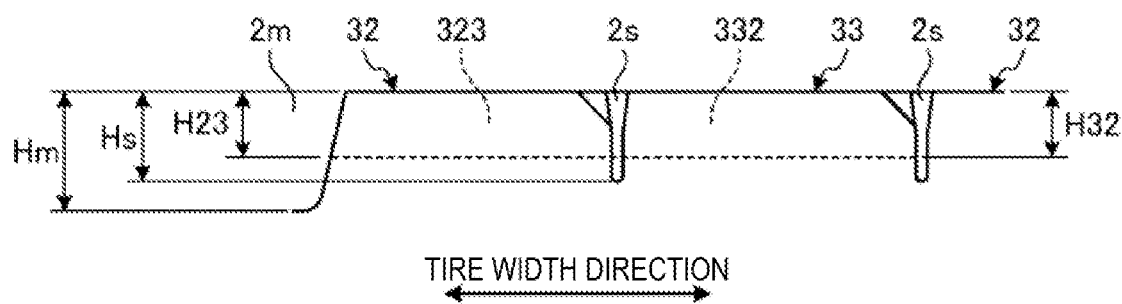
FIG. 5 is a cross-sectional view illustrating the middle land portion and the center land portion that are illustrated in FIG. 4.

FIG. 3 is an enlarged view illustrating the tread surface of the pneumatic tire 1 illustrated in FIG. 2. FIG. 4 is an enlarged view illustrating the middle land portion 32 and the center land portion 33 that are illustrated in FIG. 3. FIG. 5 is a cross-sectional view illustrating the middle land portion 32 and the center land portion 33 that are illustrated in FIG. 4.

In the configuration of FIG. 2, as illustrated in FIG. 3, the shoulder main groove 2m has a zigzag shape made by alternately connecting a long portion and a short portion (reference signs are omitted in the drawings). In such a configuration, as compared with a configuration in which the shoulder main groove 2m has a straight shape (not illustrated), the wet traction performance of the tire improves. Additionally, a circumferential length Lm of the long portion of the zigzag shape of the shoulder main groove 2m is in the range $0.65 \leq Lm/Pm \leq 0.85$ with respect to a pitch length Pm of the zigzag shape, and is preferably in the range $0.73 \leq Lm/Pm \leq 0.78$.

Additionally, in the configuration of FIG. 2, as illustrated in FIG. 3, the circumferential narrow groove 2s has a zigzag shape made by alternately connecting a long portion and a short portion (reference signs are omitted in the drawings).

In such a configuration, (1) the land portions 32, 33 in the tread portion center region are defined and formed by the plurality of circumferential narrow grooves 2s, 2s, and thus, as compared with a configuration in which the circumferential main groove is provided in the tread portion center region (not illustrated), the groove area of the tread portion center region is reduced. Accordingly, the rigidity of the tread portion center region increases, and the rolling resistance of the tire is reduced, and additionally, the uneven wear resistance performance of the tire improves. Additionally, (2) the circumferential narrow groove 2s has the zigzag shape made by alternately connecting the long portion and the short portion, and thus, groove walls of the circumferential narrow groove 2s mate each other when the tire comes into contact with the ground. Accordingly, the rigidity of the middle land portion 32 and of the center land portion 33 is reinforced. Accordingly, as compared with a configuration in which the circumferential narrow groove has a straight shape (not illustrated), the rolling resistance of the tire is reduced.

Additionally, in the configuration of FIG. 3, the long portion of the zigzag shape of the circumferential narrow groove 2s is inclined in mutually opposite directions in the tire circumferential direction with respect to the long portion of the zigzag shape of the shoulder main groove 2m. Additionally, the pitch number of the zigzag shape of the circumferential narrow groove 2s is equal to the pitch number of the zigzag shape of the shoulder main groove 2m. Additionally, the long portion of the circumferential narrow groove 2s has an arc shape that projects toward the tire equatorial plane CL side. In such a configuration, during rolling of the tire, the engagement force of an edge portion of the middle land portion 32 and an edge portion of the center land portion 33 that are adjacent to each other with the circumferential narrow groove 2s being sandwiched between the edge portions increases. Accordingly, the deformation of the land portions 32, 33 is suppressed, and the rolling resistance of the tire is reduced. However, no such limitation is intended, and the long portion of the circumferential narrow groove 2s may have a straight shape (not illustrated).

Additionally, a circumferential length Ls of the long portion of the circumferential narrow groove 2s is in the range $0.85 \leq Ls/Ps \leq 1.00$ with respect to a pitch length Ps of the zigzag shape, and is preferably in the range $0.90 \leq Ls/Ps \leq 0.96$. Accordingly, the zigzag shape of the circumferential narrow groove 2s is properly set. Particularly, according to the lower limit described above, the engagement force of the edge portions of the land portions 32, 33 is ensured, and additionally, an edge component increases, and the low rolling resistance performance and wet braking performance of the tire improve.

Additionally, in FIG. 3, an amplitude As (see FIG. 4) of the zigzag shape of the circumferential narrow groove 2s has the relationship $0.10 \leq As/Wb2 \leq 0.50$ with respect to a maximum ground contact width Wb2 of the middle land portion 32, and preferably has the relationship $0.15 \leq As/Wb2 \leq 0.35$. In such a configuration, an engagement margin of a middle block 322 and the center land portion 33 that are adjacent to each other in the tire circumferential direction with the short portion of the zigzag shape of the circumferential narrow groove 2s being sandwiched between the middle block 322 and the center land portion 33 is ensured when the tire comes into contact with the ground. Accordingly, the rigidity of the middle land portion 32 is secured, and the rolling resistance of the tire is reduced.

Additionally, in FIG. 5, the maximum groove depth Hs of the circumferential narrow groove 2s has the relationship $0.60 \leq Hs/Hm \leq 1.00$ with respect to the maximum groove depth Hm of the shoulder main groove 2m. Thus, the circumferential narrow grooves 2s, 2s each have the groove depth equal to or less than the groove depth of the shoulder main groove 2m.

Additionally, in FIG. 3, the maximum ground contact width Wb2 of the middle land portion 32 has the relationship $0.10 \leq Wb2/TW \leq 0.25$ with respect to the tire ground contact width TW (see FIG. 2), and preferably has the relationship $0.15 \leq Wb2/TW \leq 0.20$. Additionally, a maximum ground contact width Wb3 of the center land portion 33 has the relationship $0.10 \leq Wb3/TW \leq 0.25$ with respect to the tire ground contact width TW, and preferably has the relationship $0.15 \leq Wb3/TW \leq 0.20$. Additionally, the maximum ground contact widths Wb2, Wb3 of the middle land portion 32 and the center land portion 33 are substantially identical, and have the relationship $0.80 \leq Wb3/Wb2 \leq 1.20$, and preferably have the relationship $0.90 \leq Wb3/Wb2 \leq 1.10$.

The ground contact widths Wb2, Wb3 of the land portions are each measured as a linear distance in a tire axial direction in a contact surface of the land portion and a flat plate when the tire is mounted on a specified rim, inflated to a specified internal pressure, placed perpendicular to the flat plate in a static state, and subjected to a load corresponding to a specified load.

The tire ground contact width TW is measured as a maximum linear distance in the tire axial direction of a contact surface of the tire and a flat plate when the tire is mounted on a specified rim, inflated to a specified internal pressure, placed perpendicular to the flat plate in a static state, and subjected to a load corresponding to a specified load.

Middle Land Portion

In the configuration of FIG. 2, the middle land portion 32 includes a plurality of middle lug grooves 321, a plurality of the middle blocks 322, and a plurality of S-shaped sipes 323.

As illustrated in FIG. 3, the middle lug grooves 321 extend in the tire width direction and extend through the middle land portion 32, and are connected to each of the shoulder main groove 2m and the circumferential narrow groove 2s. Additionally, the middle lug grooves 321 each have a straight shape or a gentle arc shape. Additionally, the middle lug grooves 321 each include one end portion connected to the center of the long portion of the zigzag shape of the shoulder main groove 2m, and each include the other end portion connected to a maximum amplitude position toward the tire ground contact edge T side of the zigzag shape of the circumferential narrow groove 2s. Additionally, one of the groove walls of the short portion of the zigzag shape of the circumferential narrow groove 2s is flush with one of groove walls of each of the middle lug grooves 321 (see FIG. 6 described below). Additionally the plurality of middle lug grooves 321 are arranged at a predetermined interval in the tire circumferential direction. Additionally, the pitch number of the middle lug grooves 321 is equal to the pitch number of the zigzag shape of the shoulder main groove 2m.

Additionally, in FIG. 3, an inclination angle θ21 with respect to the tire circumferential direction of each of the middle lug grooves 321 is in the range 50 degrees $\leq \theta 21 \leq$ 90 degrees, and is preferably in the range 60 degrees $\leq \theta 21 \leq$ 80 degrees.

The inclination angle θ21 of the middle lug groove 321 is measured as an inclination angle with respect to the tire circumferential direction of an imaginary straight line connecting both the end portions of the middle lug groove 321.

Additionally, the middle lug groove 321 has a groove width W21 (see FIG. 4) of 4.0 mm or more and 11.0 mm or less and a maximum groove depth H21 of 7.5 mm or more (see FIG. 6 described below). Additionally, the maximum groove depth H21 of the middle lug groove 321 has the relationship $0.30 \leq H21/Hm \leq 0.95$ with respect to the maximum groove depth Hm (see FIG. 5) of the shoulder main groove 2m. Thus, the middle lug groove 321 is shallower than the shoulder main groove 2m. Additionally, the maximum groove depth H21 of the middle lug groove 321 is shallower than the maximum groove depth Hs of the circumferential narrow groove 2s (H21<Hs. see FIG. 6).

As illustrated in FIG. 2, the middle block 322 is defined and formed by the middle lug grooves 321, 321 adjacent to each other. Additionally, the plurality of middle blocks 322 are arranged at a predetermined interval in the tire circumferential direction. Additionally, as illustrated in FIG. 3, the shoulder main groove 2m has the zigzag shape made by connecting the long portion and the short portion, and the middle lug groove 321 is connected to the center of the long portion of the zigzag shape of the shoulder main groove 2m. Additionally, the circumferential narrow groove 2s has the zigzag shape made by connecting the long portion and the short portion, and the middle lug groove 321 is connected to the maximum amplitude position toward the tire ground contact edge T side of the zigzag shape of the circumferential narrow groove 2s. Additionally, the long portion of the zigzag shape of the circumferential narrow groove 2s has an arc shape that projects toward the tire equatorial plane CL side. Thus, as illustrated in FIG. 4, the middle block 322 has a zigzag shape including a pair of maximum amplitude positions in an edge portion on the shoulder main groove 2m side, and has an arc shape that projects toward the tire equatorial plane CL in an edge portion on the circumferential narrow groove 2s side. Additionally, the middle lug groove 321 is inclined at the predetermined angle θ21, and thus the middle block 322 has a substantially parallelogram shape as a whole.

As illustrated in FIG. 4, each of the S-shaped sipes 323 is a sipe having an S-shape, and the S-shaped sipe 323 closes when the tire comes into contact with the ground. Additionally, the S-shaped sipe 323 has a maximum width W23 of less than 1.5 mm and a maximum depth H23 (see FIG. 5) of 2.0 mm or more, and preferably has the maximum width W23 of 0.5 mm or more and 0.9 mm or less and the maximum depth H23 of 7.0 mm or more and 14.0 mm or less. The S-shape is defined as a shape made by smoothly connecting two arcs at one inflection point. Additionally, the S-shaped sipe 323 has an S-shape having an inclination angle with respect to the tire circumferential direction that is increased toward each of both end portions. Such an S-shaped sipe 323 is preferable in that, as compared with a sipe having a zigzag shape, a stepped shape, or other bent shapes, heal and tow wear originating from a bend point is suppressed.

The sipe width is measured as an opening width of the sipe in the tread contact surface, when the tire is mounted on a specified rim, inflated to a specified internal pressure, and in an unloaded state.

The sipe depth is measured as a distance from the tread contact surface to a sipe bottom, when the tire is mounted on a specified rim, inflated to a specified internal pressure, and in an unloaded state. Additionally, in a configuration in which the sipe includes, in the sipe bottom, a partial raised bottom portion or a partial recess/protrusion portion, the sipe depth is measured excluding these portions.

Additionally, the S-shaped sipe 323 extends through the middle land portion 32 in the tire width direction and is connected to each of the shoulder main groove 2m and the circumferential narrow groove 2s. Additionally, the single S-shaped sipe 323 is formed between the middle lug grooves 321, 321 adjacent to each other, that is, in one middle block 322. In the configuration of FIG. 4, the S-shaped sipe 323 includes one end portion connected to a maximum amplitude position toward the tire equatorial plane CL side of the zigzag shape of the shoulder main groove 2m, and the other end portion connected to the center of the long portion of the circumferential narrow groove 2s. Additionally, a connection portion of the S-shaped sipe 323 with respect to the shoulder main groove 2m is at a position of 30% or more and 70% or less from one end of a circumferential length (dimension symbol omitted in the drawings) of the edge portion on the shoulder main groove 2m side of the middle block 322, and a connection portion of the S-shaped sipe 323 with respect to the circumferential narrow groove 2s is at a position of 30% or more and 70% or less from one end of a circumferential length (dimension symbol omitted in the drawings) of the edge portion on the circumferential narrow groove 2s side of the middle block 322. Accordingly, the circumferential lengths of the edge portions of the middle block 322 defined by the middle lug groove 321 and the S-shaped sipe 323 are ensured, and the uneven wear of the middle block 322 is suppressed.

Additionally, in FIG. 3, an inclination angle θ23 of the S-shaped sipe 323 with respect to the tire circumferential direction is in the range 45 degrees≤θ23≤65 degrees. Additionally, the inclination angle θ23 of the S-shaped sipe 323 is in the range 4 degrees≤θ21−θ23≤15 degrees with respect to the inclination angle θ21 of the middle lug groove 321, and is preferably in the range 7 degrees≤θ21−θ23≤12 degrees.

The inclination angle θ23 of the S-shaped sipe 323 is measured as an inclination angle with respect to the tire circumferential direction of an imaginary straight line connecting both the end portions of the S-shaped sipe 323.

Note that in the configuration of FIG. 3, as described above, the middle land portion 32 includes the plurality of lug grooves 321 that extend through the middle land portion 32, and additionally, the single S-shaped sipe 323 is disposed in the middle block 322 defined by the lug grooves 321, 321 adjacent to each other. In such a configuration, the middle land portion 32 on the tire ground contact edge T side of the circumferential narrow groove 2s includes the lug grooves 321, and thus, this is preferable in that the drainage properties of the tread portion center region improve. However, no such limitation is intended, and the middle land portion 32 may include sipes instead of the lug grooves 321, and accordingly, the middle land portion 32 may be a rib including a continuous road contact surface when the tire comes into contact with the ground (not illustrated). Accordingly, the rigidity of the middle land portion 32 is reinforced, and the rolling resistance of the tire is effectively reduced.

Center Land Portion

In the configuration of FIG. 2, the center land portion 33 includes a plurality of center sipes 331 and a plurality of S-shaped sipes 332.

As illustrated in FIG. 3, the center sipes 331 extend in the tire width direction, extend through the center land portion 33, and are connected to each of the circumferential narrow grooves 2s, 2s adjacent to each other. Additionally, the center sipes 331 each have a straight shape or a gentle arc shape. Additionally, both end portions of each of the center sipes 331 are connected to maximum amplitude positions toward the tire equatorial plane CL side of the zigzag shapes of the circumferential narrow grooves 2s, 2s of left and right, respectively. Additionally, the center sipes 331 each are connected via the short portion of the zigzag shape of the circumferential narrow groove 2s to the middle lug groove 321 of the middle land portion 32. Additionally, the plurality of center sipes 331 are arranged at a predetermined interval in the tire circumferential direction. Additionally, the pitch number of the center sipes 331 is equal to the pitch number of the zigzag shape of the circumferential narrow groove 2s.

Additionally, in FIG. 3, an inclination angle θ31 with respect to the tire circumferential direction of each of the center sipes 331 is in the range 65 degrees≤θ31≤85 degrees, and is preferably in the range 70 degrees≤θ31≤75 degrees.

The inclination angle θ31 of the center sipe 331 is measured as an inclination angle with respect to the tire circumferential direction of an imaginary straight line connecting both the end portions of the center sipe 331.

Additionally, the center sipe 331 has a maximum width W31 (see FIG. 4) of less than 1.5 mm and a maximum depth H31 (see FIG. 7) of 2.0 mm or more, and preferably has the maximum width W31 of 0.5 mm or more and 0.9 mm or less and the maximum depth H31 of 7.0 mm or more and 14.0 mm or less. Additionally, the maximum depth H31 of the center sipe 331 has the relationship 0.30≤H31/Hm≤0.90 with respect to the maximum groove depth Hs of the circumferential narrow groove 2s (see FIG. 7). Thus, the center sipe 331 is shallower than the circumferential narrow groove 2s.

As illustrated in FIG. 4, each of the S-shaped sipes 332 is a sipe having an S-shape, and the S-shaped sipe 332 closes when the tire comes into contact with the ground. Additionally, the S-shaped sipe 332 has a maximum width W32 of less than 1.5 mm and a maximum depth H32 (see FIG. 5) of 2.0 mm or more, and preferably has the maximum width W32 of 0.5 mm or more and 0.9 mm or less and the maximum depth H32 of 7.0 mm or more and 14.0 mm or less. Additionally, the S-shaped sipe 332 has an S-shape having an inclination angle with respect to the tire circumferential direction that is increased toward each of both end portions.

Additionally, the S-shaped sipe 332 extends through the center land portion 33 in the tire width direction and is connected to each of the circumferential narrow grooves 2s, 2s of left and right. Additionally, the single S-shaped sipe 332 is formed between the center sipes 331, 331 adjacent to each other. In the configuration of FIG. 4, each of the end portions of the S-shaped sipe 332 is connected to the center of the long portion of the circumferential narrow groove 2s. Additionally, each of connection portions of the S-shaped sipe 332 with respect to the circumferential narrow grooves 2s, 2s is at a position of 30% or more and 70% or less from one end of a pitch length (dimension symbol omitted in the drawings) of the center sipe 331.

Additionally, in FIG. 3, an inclination angle θ32 of the S-shaped sipe 332 with respect to the tire circumferential direction is in the range 55 degrees≤θ32≤75 degrees. Additionally, the inclination angle θ32 of the S-shaped sipe 332 is in the range of 0 degrees≤θ31−θ32≤15 degrees with respect to the inclination angle θ31 of the center sipe 331, and is preferably in the range of 5 degrees≤θ31−θ32≤10 degrees.

The inclination angle θ32 of the S-shaped sipe 332 is measured as an inclination angle with respect to the tire circumferential direction of an imaginary straight line connecting both the end portions of the S-shaped sipe 332.

Additionally, as illustrated in FIG. 4, the connection portion of the S-shaped sipe 323 of the middle land portion 32 with respect to the circumferential narrow groove 2s and the connection portion of the S-shaped sipe 332 of the center land portion 33 with respect to the circumferential narrow groove 2s are at an identical position in the tire circumferential direction. Specifically, when a distance in the tire circumferential direction (dimension symbol omitted in drawings) of extension lines of center lines of the S-shaped sipes 323, 332 on a groove center line of the circumferential narrow groove 2s is in the range of 50% or less with respect to the groove width Ws of the circumferential narrow groove 2s, the connection portions of the S-shaped sipes 323, 332 with respect to the circumferential narrow groove 2s are at an identical position in the tire circumferential direction. Additionally, extension lines of groove center lines of the S-shaped sipes 323, 332 adjacent to each other intersect substantially perpendicular (at 70 degrees or more and 115 degrees or less) with respect to the groove center line of the circumferential narrow groove 2s. Thus, the S-shaped sipes 323, 332 adjacent to each other extend continuously in the tire width direction.

In the configuration described above, (1) the first and second land portions 32, 33 that are adjacent to each other with the circumferential narrow groove 2s being sandwiched between the first and second land portions 32, 33 include the S-shaped sipes 323, 332, respectively and thus, as compared with a configuration in which the land portion includes a sipe having a zigzag shape, a stepped shape, or other bent portions (not illustrated), variation in rigidity in road contact surfaces of the land portions 32, 33 is reduced and uneven wear (particularly, heal and tow wear) originating from the sipe is suppressed. Further, (2) the S-shaped sipes 323, 332 of the first and second land portions 32, 33 are connected at an identical position in the tire circumferential direction with respect to the circumferential narrow groove 2s, and thus, as compared with a configuration in which the connection portions of the S-shaped sipes are offset in the tire circumferential direction (not illustrated), drainage properties between the S-shaped sipes 323, 332 opposed to each other improve and the wet braking performance of the tire improves.

Additionally, the S-shaped sipes 323, 332 adjacent to each other are inclined in mutually opposite directions with respect to the tire circumferential direction and are simultaneously curved in mutually axisymmetric directions. Thus, the S-shaped sipes 323, 332 adjacent to each other each have an arch shape that projects toward one direction in the tire circumferential direction as a whole while being each curved into an S-shape. In such a configuration, each of the S-shaped sipes 323, 332 has an S-shape, and accordingly, the drainage properties of the land portions 32, 33 improve and the wet braking performance of the tire improves. Additionally, the S-shaped sipes 323, 332 adjacent to each other each have an arc shape as a whole, and accordingly, variation in the rigidity of the connection portions of the S-shaped sipes 323, 332 adjacent to each other becomes smooth, and the uneven wear resistance performance of the tire improves.

Further, in the configuration of FIG. 2, three rows of the S-shaped sipes 323, 332, 323 of the land portions 32, 33, 32 extend continuously in the tire width direction and cross the tread portion center region. Additionally, the S-shaped sipes 323, 332, 323 adjacent to one another are smoothly curved into a sine wave shape as a whole while being each curved into an S-shape. Accordingly, the wet braking performance and uneven wear resistance performance of the tire are enhanced.

Additionally, as illustrated in FIG. 3, only the center sipes 331 and the S-shaped sipes 332 described above extend through the center land portion 33, and the center land portion 33 does not include other through grooves or through sipes. Thus, the center sipes 331 and the S-shaped sipes 332 close when the tire comes into contact with the ground, and accordingly, the center land portion 33 becomes a rib including a continuous road contact surface in the tire circumferential direction. Accordingly, the rolling resistance of the tread portion center region is reduced.

Chamfered Portion

Figure 6:
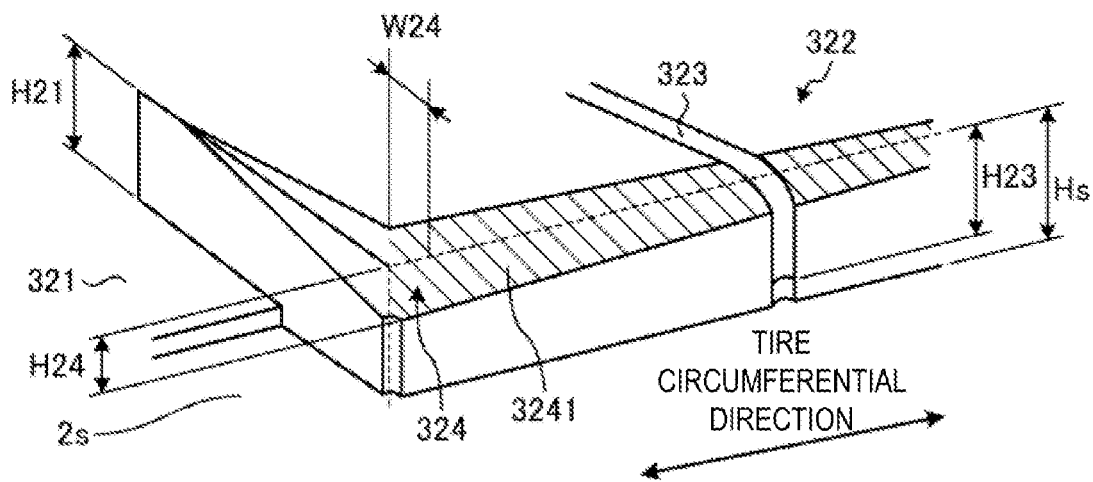
FIG. 6 is a perspective view illustrating a chamfered portion of a middle block illustrated in FIG. 4.
Figure 7:
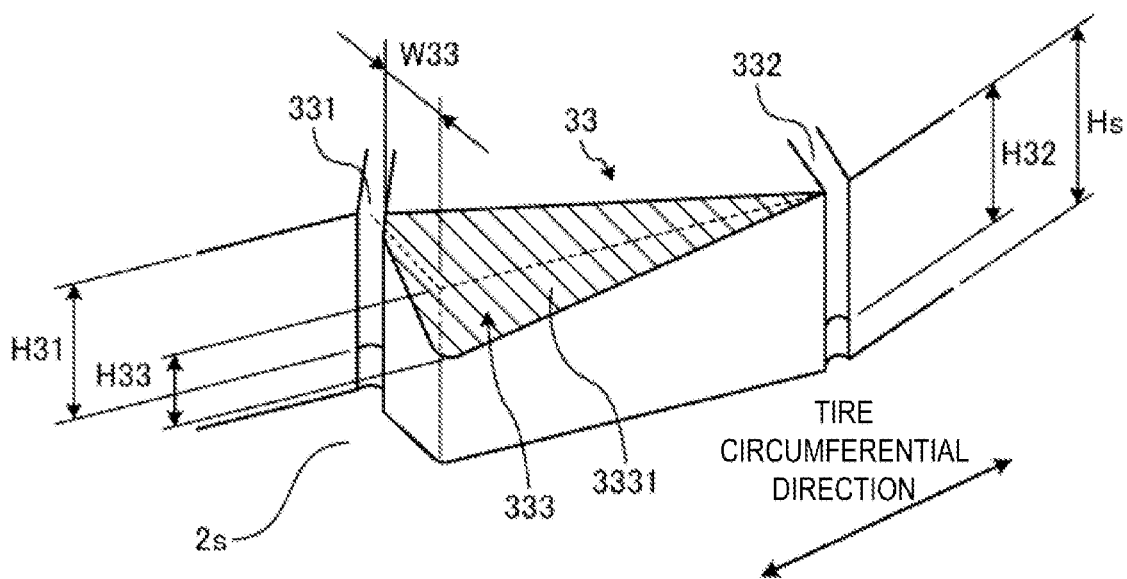
FIG. 7 is a perspective view illustrating a chamfered portion of the center land portion illustrated in FIG. 4.

FIG. 6 is a perspective view illustrating a chamfered portion 324 of the middle block 322 illustrated in FIG. 4. The same drawing illustrates the edge portion on the circumferential narrow groove 2s side of the middle block 322. FIG. 7 is a perspective view illustrating a chamfered portion 333 of the center land portion 33 illustrated in FIG. 4. The same drawing illustrates the edge portion on the circumferential narrow groove 2s side of the center land portion 33.

In the configuration of FIG. 2, as illustrated in FIGS. 3 and 4, the middle land portion 32 and the center land portion 33 include the chamfered portions 324, 333, respectively in the edge portions on the circumferential narrow groove 2s side.

The chamfered portions 324, 333 are each defined as a portion that connects the road contact surface of the land portion and a groove wall surface of the land portion by a flat surface (for example, a C-chamfer) or a curved surface (for example, an R-chamfer).

Additionally, as illustrated in FIG. 4, the chamfered portion 324 of the middle land portion 32 is formed in the edge portion on the circumferential narrow groove 2s side of the middle block 322. Additionally, a circumferential length L24 of the chamfered portion 324 of the middle land portion 32 in the edge portion on the circumferential narrow groove 2s side has the relationship $0.70 \leq L24/Ps$ with respect to the pitch length Ps of the zigzag shape of the circumferential narrow groove 2s, and preferably has the relationship $0.80 \leq L24/Ps$. An upper limit of the ratio L24/Ps is not particularly limited but is generally a difference between the pitch length Ps of the zigzag shape of the circumferential narrow groove 2s and an opening width (dimension symbol omitted in the drawings) of the middle lug groove 321 with respect to the circumferential narrow groove 2s.

The circumferential length of the chamfered portion is measured as an extension length in the tire circumferential direction of the chamfered portion that extends along the groove opening portion of the circumferential narrow groove in a tread road contact surface.

Additionally, in FIG. 6, a maximum chamfer width W24 of the chamfered portion 324 in the edge portion on the circumferential narrow groove 2s side of the middle land portion 32 (more specifically, the edge portion facing the long portion of the zigzag shape of the circumferential narrow groove 2s) is in the range $0.03 \leq W24/Wb2 \leq 0.13$ with respect to the maximum ground contact width Wb2 of the middle land portion 32 (see FIG. 4). Additionally, the maximum chamfer width W24 of the chamfered portion 324 is preferably in the range $2.0 \text{ mm} \leq W24$. Additionally, a maximum depth H24 of the chamfered portion 324 with respect to the circumferential narrow groove 2s is in the range $0.30 \leq H24/Hs \leq 0.70$ with respect to the maximum groove depth Hs of the circumferential narrow groove 2s. Additionally, the maximum depth H24 of the chamfered portion 324 is preferably in the range $5.0 \text{ mm} \leq H24$.

The width of the chamfered portion is measured as a distance in the tire width direction from the edge portion of the land portion to a ridge line of the chamfered portion in the road contact surface of the land portion. Additionally, the edge portion of the land portion is defined as an intersection point of an extension line of a groove wall of the circumferential main groove and the road contact surface of the land portion. The ridge line of the chamfered portion is defined as a boundary line between a wall surface of the chamfered portion and the road contact surface of the land portion.

The depth of the chamfered portion is measured as the maximum depth from the road contact surface of the land portion.

For example, in the configuration of FIG. 4, as described above, in a tread plane view, the circumferential narrow groove 2s has the zigzag shape made by alternately connecting the long portion and the short portion, and additionally, the middle lug grooves 321 of the middle land portion 32 extend at an incline with respect to the tire circumferential direction, and are connected to the circumferential narrow groove 2s. Thus, the middle block 322 includes the edge portion along the circumferential narrow groove 2s, and includes a corner portion having an obtuse angle, at one end of the edge portion along the circumferential narrow groove 2s, and a corner portion having an acute angle, at the other end of the edge portion along the circumferential narrow groove 2s.

Additionally, the chamfered portion 324 has an L-shape bent in the corner portion having an obtuse angle of the middle block 322, and extends continuously along the long portion of the zigzag shape of the circumferential narrow groove 2s, and terminates in the corner portion having an acute angle of the middle block 322. Thus, the chamfered portion 324 is formed throughout the edge portion on the circumferential narrow groove 2s side of the middle block 322. Additionally, the chamfered portion 324 has an arc shape that projects toward the tire equatorial plane CL side. Additionally, as illustrated in FIGS. 4 and 6, the chamfer width and the chamfer depth of the chamfered portion 324 gradually decrease from the corner portion having an obtuse angle of the middle block 322 toward the corner portion having an acute angle of the middle block 322. Additionally, in the configuration of FIG. 4, a chamfered portion that has a triangular pyramid shape and that is small (dimension symbol omitted in the drawing) is formed in the corner portion having an obtuse angle of the middle block 322.

However, no such limitation is intended, and the chamfered portion 324 may extend continuously from the corner portion having an obtuse angle of the middle block 322 along the long portion of the zigzag shape of the circumferential narrow groove 2s, and may terminate in the middle of the long portion of the zigzag shape without arriving at the corner portion having an acute angle (not illustrated). In this case, the chamfered portion 324 preferably extends at least in a region from the corner portion having an obtuse angle of the middle block 322 to the connection portion of the S-shaped sipe 323 with the circumferential narrow groove 2s. Accordingly, a function of the chamfered portion 324 is appropriately ensured.

Additionally, as illustrated in FIG. 4, the chamfered portion 333 of the center land portion 33 is formed in the edge portion on the circumferential narrow groove 2s side of the center land portion 33. Additionally, a circumferential length L33 of the chamfered portion 333 of the center land portion 33 in the edge portion on the circumferential narrow groove 2s side has the relationship $0.20 \leq L33/Ps \leq 0.60$ with respect to the pitch length Ps of the zigzag shape of the circumferential narrow groove 2s, and preferably has the relationship $0.30 \leq L33/Ps \leq 0.40$.

Additionally, in FIG. 4, the circumferential length L33 of the chamfered portion 333 of the center land portion 33 is in the range $0.30 \leq L33/L24 \leq 0.70$ with respect to the circumferential length L24 of the chamfered portion 324 of the middle land portion 32, and is preferably in the range $0.30 \leq L33/L24 \leq 0.40$. Additionally, an overlap Ld of the chamfered portion 333 of the center land portion 33 and the chamfered portion 324 of the middle land portion 32 in the tire circumferential direction has the relationship $0.15 \leq Ld/Ps \leq 0.35$ with respect to the pitch length Ps of the zigzag shape of the circumferential narrow groove 2s, and preferably has the relationship $0.20 \leq Ld/Ps \leq 0.30$.

In the configuration described above, (1) the middle land portion 32 and the center land portion 33 include the chamfered portions 324, 333 respectively in the edge portions on the circumferential narrow groove 2s side, and thus the groove volume of the circumferential narrow groove 2s is enlarged by the chamfered portions 324, 333, and the wet braking performance of the tire improves. Further, (2) the circumferential length L33 of the chamfered portion 333 of the center land portion 33 on the tire equatorial plane CL side is shorter than the circumferential length L24 of the chamfered portion 324 of the middle land portion 32 on the tire ground contact edge T side (L33<L24), and thus, as compared with a configuration in which both the chamfered portions have an identical circumferential length (not illustrated), the rigidity of the center land portion 33 is ensured, and the rolling resistance of the tire is reduced, and additionally, the uneven wear of the center land portion 33 is suppressed.

Additionally, in FIG. 7, a maximum chamfer width W33 of the chamfered portion 333 of the center land portion 33 is in the range $0.10 \leq W33/Wb3 \leq 0.25$ with respect to the maximum ground contact width Wb3 of the center land portion 33 (see FIG. 3). Additionally, the maximum chamfer width W33 of the chamfered portion 333 is preferably in the range $3.0 \text{ mm} \leq W33$. Additionally, a maximum depth H33 of the chamfered portion 333 with respect to the circumferential narrow groove 2s is in the range $0.30 \leq H33/Hs \leq 0.70$ with respect to the maximum groove depth Hs of the circumferential narrow groove 2s. Additionally, the maximum depth H33 of the chamfered portion 333 is preferably in the range $5.0 \text{ mm} \leq H33$. Additionally, the maximum depth H33 of the chamfered portion 333 of the center land portion 33 is in the range $0.90 \leq H33/H24 \leq 1.10$ with respect to the maximum depth H24 of the chamfered portion 324 of the middle land portion 32.

For example, in the configuration of FIG. 4, as described above, in a tread plane view, the circumferential narrow groove 2s has the zigzag shape made by alternately connecting the long portion and the short portion, and additionally, the center sipes 331 of the center land portion 33 extend at an incline with respect to the tire circumferential direction, and are connected to the circumferential narrow groove 2s. Thus, a ground contact region of the center land portion 33 that is defined by the center sipes 331, 331 adjacent to each other includes an edge portion along the circumferential narrow groove 2s, and additionally, one of corner portions of the ground contact region of the center land portion 33 is formed by a bent portion of the zigzag shape of the circumferential narrow groove 2s.

Additionally, the chamfered portion 333 is formed in a region including the maximum amplitude position toward the tire ground contact edge T side of the zigzag shape of the circumferential narrow groove 2s. In the configuration illustrated in FIG. 4, the chamfered portion 333 extends continuously along the circumferential narrow groove 2s from a connection portion of the circumferential narrow groove 2s with the center sipe 331, and terminates in the connection portion of the circumferential narrow groove 2s with the S-shaped sipe 332. Thus, the chamfered portion 333 has a triangle that includes, as apexes, the connection portion of the circumferential narrow groove 2s with the center sipe 331, the connection portion of the circumferential narrow groove 2s with the S-shaped sipe 332, and the maximum amplitude position toward the tire ground contact edge T side of the zigzag shape of the circumferential narrow groove 2s. Additionally, as illustrated in FIGS. 4 and 7, the chamfer width and the chamfer depth of the chamfered portion 333 gradually decrease from the maximum amplitude position toward the tire ground contact edge T side of the zigzag shape of the circumferential narrow groove 2s toward the S-shaped sipe 332.

However, no such limitation is intended, and the chamfered portion 333 may terminate in the middle of the long portion of the zigzag shape without arriving at the S-shaped sipe 332 (not illustrated), provided that the chamfered portion 333 includes the maximum amplitude position toward the tire ground contact edge T side of the zigzag shape of the circumferential narrow groove 2s. However, similarly in this case, the chamfered portion 333 of the center land portion 33 and the chamfered portion 324 of the middle land portion 32 preferably overlap each other in the tire circumferential direction. Accordingly, an interaction between the chamfered portion 333 of the center land portion 33 and the chamfered portion 324 of the middle land portion 32 is appropriately ensured.

Additionally, as illustrated in FIGS. 6 and 7, the chamfered portion 324 of the middle land portion 32 and the chamfered portion 333 of the center land portion 33 include serration processed portions 3241, 3331, respectively in a portion or all of the chamfered portions 324, 333. In FIGS. 6 and 7, the serration processed portions 3241, 3331 of the chamfered portions 324, 333 are hatched. Each of the serration processed portions 3241, 3331 is a surface processed portion made by arranging fine grooves each having a groove width of 0.3 mm or more and 1.2 mm or less and a groove depth of 0.3 mm or more and 0.8 mm or less, by a pitch length of 1.3 mm or less. According to such serration processed portions 3241, 3331, the drainage functions of the chamfered portions 324, 333 improve and the wet braking performance of the tire improves. For example, in the configuration of FIG. 6, the chamfered portion 324 of the middle land portion 32 includes the serration processed portion 3241 in a region facing the long portion of the zigzag shape of the circumferential narrow groove 2s, and on the other hand, the chamfered portion 324 of the middle land portion 32 includes no serration processed portion in a region facing the short portion of the zigzag shape of the circumferential narrow groove 2s and the middle lug groove 321. Additionally, in the configuration of FIG. 7, the chamfered portion 333 of the center land portion 33 includes the serration processed portion 3331 throughout the chamfered portion 333.

Additionally, in the configuration of FIG. 4, as illustrated in FIGS. 6 and 7, the circumferential narrow groove 2s includes widened portions each having a cylindrical shape (reference sign omitted in the drawings), in the connection portions of the S-shaped sipe 323 of the middle land portion 32 and the S-shaped sipe 332 of the center land portion 33, and in the connection portion with the center sipe 331 of the center land portion 33. The widened portions each have an outer diameter that is larger than each of the widths of the circumferential narrow groove 2s and the sipes 323, 331, 332. Accordingly, drainage properties from the circumferential narrow groove 2s to the sipes 323, 331, 332 improve, and the wet braking performance of the tire improves.

Tread Portion Shoulder Region

In the configuration in FIG. 2, as described above, the tire 1 includes the pair of shoulder main grooves 2m, 2m and the pair of shoulder land portions 31, 31 defined and formed by these shoulder main grooves 2m, 2m. Additionally, a groove center line (not illustrated) of the shoulder main groove 2m has a zigzag shape as a whole made by alternately connecting a long portion and a short portion.

Additionally, in FIG. 2, the shoulder land portion 31 includes a plurality of shoulder lug grooves 311 and a plurality of shoulder blocks 312.

The shoulder lug grooves 311 extend in the tire width direction, and extend through the shoulder land portion 31, and open to the shoulder main groove 2m and the tire ground contact edge T. Additionally, the plurality of shoulder lug grooves 311 are arranged at a predetermined interval in the tire circumferential direction. Additionally, the shoulder lug grooves 311 each have a groove width of 4.0 mm or more and 12.0 mm or less and a maximum groove depth of 2.0 mm or more (dimension symbols omitted in the drawings). Additionally, a maximum groove depth of each of the shoulder lug grooves 311 is much shallower than the maximum groove depth H21 of the middle lug groove 321 (see FIG. 6), and is in the range of 10% or more and 30% or less with respect to the maximum groove depth H21 of the middle lug groove 321. Accordingly, the rolling resistance of the tire is reduced, and additionally, the uneven wear of the shoulder land portion 31 is suppressed.

Each of the shoulder blocks 312 is defined and formed by the shoulder lug grooves 311, 311 adjacent to each other. Additionally, the plurality of shoulder blocks 312 are arranged at a predetermined interval in the tire circumferential direction. Additionally, the pitch number of the shoulder blocks 312 is equal to the pitch number of the middle blocks 322 of the middle land portion 32.

Effect

As described above, the tire 1 includes the circumferential narrow groove 2s disposed in the tread portion center region and having the groove width Ws (see FIG. 4) of 0.5 mm or more and 3.0 mm or less, and the first land portion 32 (the middle land portion 32 in FIG. 2) defined by the circumferential narrow groove 2s and the second land portion 33 (the center land portion 33 in FIG. 2) located further on the tire equatorial plane CL side than the first land portion 32 and adjacent to the first land portion 32 (see FIG. 2). Additionally, the first and second land portions 32, 33 include the chamfered portions 324, 333, respectively in the edge portions on the circumferential narrow groove 2s side (see FIGS. 4, 6, and 7). Additionally, the circumferential length L33 of the chamfered portion 333 of the second land portion 33 has the relationship L33<L24 with respect to the circumferential length L24 of the chamfered portion 324 of the first land portion 32.

In such a configuration, (1) the tire 1 includes the circumferential narrow groove 2s in the tread portion center region, and thus, as compared with a configuration in which the main groove is provided instead of the circumferential narrow groove (not illustrated), the groove area of the tread portion center region is reduced. Accordingly, this is advantageous in that the rigidity of the tread portion center region increases, and the rolling resistance of the tire is reduced, and additionally, the uneven wear resistance performance of the tire improves. Additionally, (2) the first and second land portions 32, 33 include the chamfered portions 324, 333, respectively in the edge portions on the circumferential narrow groove 2s side, and thus, this is advantageous in that the groove volume of the circumferential narrow groove 2s is enlarged by the chamfered portions 324, 333, and the wet braking performance of the tire improves. Further, (3) the circumferential length L33 of the chamfered portion 333 of the second land portion 33 on the tire equatorial plane CL side is shorter than the circumferential length L24 of the chamfered portion 324 of the first land portion 32 on the tire ground contact edge T side (L33<L24), and thus, this is advantageous in that, as compared with a configuration in which both the chamfered portions have an identical circumferential length (not illustrated), the rigidity of the second land portion 33 is ensured, and the rolling resistance of the tire is reduced, and additionally, the uneven wear of the center land portion 33 is suppressed.

Additionally, in the tire 1, the circumferential length L33 of the chamfered portion 333 of the second land portion 33 is in the range 0.30≤L33/L24≤0.70 with respect to the circumferential length L24 of the chamfered portion 324 of the first land portion 32. This is advantageous in that according to the lower limit described above, the circumferential length L33 of the chamfered portion 333 is ensured, and the effect of improving wet braking performance by the chamfered portion 333 is ensured, and that according to the upper limit described above, the effect of reducing rolling resistance and the effect of suppressing uneven wear by the shortness of the circumferential length L33 of the chamfered portion 333 on the tire equatorial plane CL side are ensured.

Additionally, in the tire 1, the maximum chamfer width W24 (see FIG. 6) of the chamfered portion 324 in the edge portion on the circumferential narrow groove 2s side of the first land portion 32 is in the range 0.03≤W24/Wb2≤0.13 with respect to the maximum ground contact width Wb2 (see FIG. 4) of the first land portion 32. This is advantageous in that according to the lower limit described above, the effect of improving drainage properties by the chamfered portion 324 is ensured, and that according to the upper limit described above, reduction in the rigidity of the first land portion 32 due to excessive enlargement of the chamfered portion 324 is suppressed.

Additionally, in the tire 1, the overlap Ld of the chamfered portion 324 of the first land portion 32 and the chamfered portion 333 of the second land portion 33 in the tire circumferential direction has the relationship 0.15≤Ld/Ps≤0.35 with respect to the pitch length Ps of the zigzag shape of the circumferential narrow groove 2s (see FIG. 4). In such a configuration, the chamfered portions 324, 333 of the land portions 32, 33 adjacent to each other overlap each other with the circumferential narrow groove 2s being sandwiched between the chamfered portions 324, 333, and thus, this is advantageous in that the drainage functions of the chamfered portions 324, 333 efficiently improve.

Additionally, in the tire 1, the maximum chamfer width W33 (see FIG. 7) of the chamfered portion 333 of the second land portion 33 is in the range 0.10≤W33/Wb3≤0.25 with respect to the maximum ground contact width Wb3 (see FIG. 3) of the second land portion 33. This is advantageous in that according to the lower limit described above, the effect of improving wet braking performance by the chamfered portion 333 is ensured, and that according to the upper limit described above, reduction in the rigidity of the second land portion 33 due to excessive enlargement of the chamfered portion 333 is suppressed.

Additionally, in the tire 1, the circumferential narrow groove 2s has the zigzag shape made by alternately connecting the long portion and the short portion (see FIG. 3). In such a configuration, the groove walls of the circumferential narrow groove 2s mate each other when the tire comes into contact with the ground, and accordingly, the rigidity of the land portions 32, 33 is reinforced. Accordingly, this is advantageous in that, as compared with a configuration in which the circumferential narrow groove has a straight shape (not illustrated), the rolling resistance of the tire is reduced.

Additionally, in the tire 1, the long portion of the circumferential narrow groove 2s has an arc shape that projects toward the tire equatorial plane CL side. In such a configuration, the edge portion on the circumferential narrow groove 2s side of the first land portion 32 projects toward the tire equatorial plane CL side, and thus, this is advantageous in that, as compared with a configuration in which the long portion of the circumferential narrow groove has a straight shape, the wet traction performance of the tire improves by the edge effect of the long portion of the circumferential narrow groove 2s.

Additionally, in the tire 1, the amplitude As of the circumferential narrow groove 2s is in the range 0.10≤As/Wb2≤0.50 with respect to the maximum ground contact width Wb2 of the first land portion 32 (see FIG. 4). This is advantageous in that according to the lower limit described above, the effect of reducing rolling resistance by the zigzag shape of the circumferential narrow groove 2s is ensured, and that according to the upper limit described above, generation of uneven wear due to excessive enlargement of the amplitude As is suppressed.

Additionally, in the tire 1, the circumferential length L33 of the chamfered portion 333 of the second land portion 33 in the edge portion on the circumferential narrow groove 2s side has the relationship 0.20≤L33/Ps≤0.60 with respect to the pitch length Ps of the zigzag shape of the circumferential narrow groove 2s (see FIG. 4). This is advantageous in that according to the lower limit described above, the effect of improving wet braking performance by the chamfered portion 333 is ensured, and that according to the upper limit described above, reduction in the rigidity of the second land portion 33 due to excessive enlargement of the chamfered portion 333 is suppressed.

Additionally, in the tire 1, the first land portion 32 includes the plurality of lug grooves 321 that extend at an incline with respect to the tire circumferential direction and that extend through the first land portion 32, and the plurality of blocks 322 each defined by the lug grooves 321 adjacent to each other (see FIG. 2). Additionally, the blocks 322 each include the corner portion having an obtuse angle, at one end of the edge portion on the circumferential narrow groove 2s side, and each include the corner portion having an acute angle, at the other end of the edge portion on the circumferential narrow groove 2s side (see FIG. 4). Additionally, the chamfered portion 324 of the first land portion 32 extends from the corner portion having an obtuse angle toward the corner portion having an acute angle of the block 322 while narrowing the chamfer width (see FIG. 6). Accordingly, this is advantageous in that the chamfer width of the chamfered portion 324 can be ensured while ensuring the rigidity of the blocks 322.

Additionally, in the tire 1, the circumferential narrow groove 2s has the zigzag shape made by alternately connecting the long portion and the short portion (see FIG. 2). Additionally, the second land portion 33 is the rib including the continuous road contact surface in the tire circumferential direction when the tire comes into contact with the ground. Additionally, the chamfered portion 333 of the second land portion 33 is formed in the region including the maximum amplitude position toward the tire ground contact edge T side of the zigzag shape of the circumferential narrow groove 2s (see FIG. 4). Accordingly, this is advantageous in that the chamfer width of the chamfered portion 333 (see FIG. 7) can be ensured while ensuring the rigidity of the land portion 33.

Additionally, the tire 1 includes the pair of shoulder main grooves 2m, 2m, two or more of the circumferential narrow grooves 2s disposed between the pair of shoulder main grooves 2m, 2m, and five or more rows of the land portions 31 to 33 defined and formed by the shoulder main grooves 2m and the circumferential narrow grooves 2s (see FIG. 2). Additionally, the tire 1 includes no other circumferential groove having a maximum groove width exceeding 3.0 mm in the region between the pair of shoulder main grooves 2m, 2m. In such a configuration, a single ground contact region including a substantially continuous ground contact surface is formed in the tread portion center region. Accordingly, this is advantageous in that the rigidity of the tread portion center region is ensured and the rolling resistance of the tire is reduced.

Target of Application

Additionally, the tire 1 is a heavy duty tire mounted on a drive shaft of a tractor head. Such a tire is a target of application, and accordingly, the effect of improving the low rolling resistance performance, uneven wear resistance performance, and wet braking performance of the tire is effectively obtained.

Additionally, in the embodiments, a pneumatic tire is described as an example of the tire. However, no such limitation is intended, and the configurations described in the embodiments can also be applied to other tires in a discretionary manner within the scope of obviousness to one skilled in the art. Examples of other tires include an airless tire, and a solid tire.

Examples

FIGS. 8 and 9 are tables showing the results of performance tests of tires according to embodiments of the technology.

In the performance tests, (1) low rolling resistance performance, (2) uneven wear resistance performance, and (3) wet braking performance were evaluated for a plurality of types of test tires. Additionally, test tires each having a tire size of 295/75R22.5 were manufactured. Additionally, the test tires were each mounted on a drive shaft of a 2-D (tractor head) that is a test vehicle.

(2) In the evaluation of low rolling resistance performance, a drum testing machine having a drum diameter of 1707 mm is used, and multiplicative inverses of rolling resistance coefficients of the test tires are calculated under a load of 23.34 kN, an air pressure of 760 kPa and a speed of 80 km/h in accordance with ISO (International Organization for Standardization) 28580. The evaluation is expressed as index values and evaluated, with Comparative Example being assigned as the reference (100). In the evaluation, larger values are preferable.

(2) In the evaluation of uneven wear resistance performance, after the test vehicle runs 30000 km on a predetermined paved road, the degree of heel and toe wear is observed and expressed as index values and evaluated. The evaluation is expressed as index values and evaluated, with Comparative Example being assigned as the reference (100). In the evaluation, larger values are preferable.

(3) In the evaluation of wet braking performance, the test vehicle runs on an asphalt road on which water is sprinkled to a water depth of 1 mm, and a braking distance from an initial speed of 40 km/h is measured. Then, the evaluation is expressed as index values and evaluated, with Comparative Example being assigned as the reference (100). In the evaluation, larger values are preferable.

The test tires of Examples each include the configurations of FIGS. 1 and 2, and each include the pair of shoulder main grooves 2m, 2m, the pair of circumferential narrow grooves 2s, 2s, the pair of shoulder land portions 31, 31, the pair of middle land portions 32, 32, and the single center land portion 33. Additionally, the shoulder main groove 2m has the maximum groove width Wm of 14.0 mm and the maximum groove depth Hm of 20.0 mm. Additionally, the circumferential narrow groove 2s has the maximum groove width Ws of 2.0 mm and the maximum groove depth Hs of 20.0 mm. Additionally, the tire ground contact width TW is 230 mm, the maximum ground contact width Wb2 of the middle land portion 32 is 39 mm, and the maximum ground contact width Wb3 of the center land portion 33 is 40 mm.

The test tire of Comparative Example is a test tire of Example 1 in which the pair of middle land portions 32, 32 and the center land portion 33 do not include the chamfered portions 324, 333.

As can be seen from the test results, the test tires of Examples provide the low rolling resistance performance, uneven wear resistance performance, and wet braking performance of the tire in a compatible manner.

The invention claimed is:

1. A tire, comprising:
   a circumferential narrow groove disposed in a tread portion center region and having a groove width of 0.5 mm or more and 2.5 mm or less; and
   a first land portion defined by the circumferential narrow groove and a second land portion located further on a tire equatorial plane side than the first land portion and adjacent to the first land portion;
   each of the first land portion and the second land portion comprising a chamfered portion in an edge portion on a circumferential narrow groove side, and
   a circumferential length L33 of the chamfered portion of the second land portion having a relationship L33<L24 with respect to a circumferential length L24 of the chamfered portion of the first land portion, wherein
   the tire comprises a pair of shoulder main grooves, two or more of the circumferential narrow grooves disposed between the pair of shoulder main grooves, and five or more rows of land portions defined and formed by the shoulder main grooves and the circumferential narrow grooves, and
   the tire comprises no other circumferential groove having a maximum groove width exceeding 3.0 mm in a region between the pair of shoulder main grooves, wherein
   the first land portion comprises a plurality of lug grooves that extend at an incline with respect to a tire circumferential direction and that extend through the first land portion, and a plurality of blocks each defined by the lug grooves adjacent to each other,
   the blocks each comprise a corner portion having an obtuse angle, at one end of the edge portion on the circumferential narrow groove side, and each comprise a corner portion having an acute angle, at the other end of the edge portion on the circumferential narrow groove side, and
   the chamfered portion of the first land portion extends from the corner portion having an obtuse angle toward the corner portion having an acute angle of the block while narrowing a chamfer width.

2. The tire according to claim 1, wherein the circumferential length L33 of the chamfered portion of the second land portion is in a range $0.30 \leq L33/L24 \leq 0.70$ with respect to the circumferential length L24 of the chamfered portion of the first land portion.

3. The tire according to claim 2, wherein a maximum chamfer width W24 of the chamfered portion in the edge portion on the circumferential narrow groove side of the first land portion is in a range $0.03 \leq W24/Wb2 \leq 0.13$ with respect to a maximum ground contact width Wb2 of the first land portion.

4. The tire according to claim 3, wherein an overlap Ld of the chamfered portion of the first land portion and the chamfered portion of the second land portion in a tire circumferential direction has a relationship $0.15 \leq Ld/Ps \leq 0.35$ with respect to a pitch length Ps of a zigzag shape of the circumferential narrow groove.

5. The tire according to claim 4, wherein a maximum chamfer width W33 of the chamfered portion of the second land portion is in a range $0.10 \leq W33/Wb3 \leq 0.25$ with respect to a maximum ground contact width Wb3 of the second land portion.

6. The tire according to claim 5, wherein the circumferential narrow groove has a zigzag shape made by alternately connecting a long portion and a short portion.

7. The tire according to claim 6, wherein the long portion of the circumferential narrow groove has an arc shape that projects toward the tire equatorial plane side.

8. The tire according to claim 7, wherein an amplitude As of the circumferential narrow groove is in a range $0.10 \leq As/Wb2 \leq 0.50$ with respect to the maximum ground contact width Wb2 of the first land portion.

9. The tire according to claim 8, wherein the circumferential length L33 of the chamfered portion of the second land portion in the edge portion on the circumferential narrow groove side has a relationship $0.20 \leq L33/Ps \leq 0.60$ with respect to the pitch length Ps of the zigzag shape of the circumferential narrow groove.

10. The tire according to claim 1, wherein a maximum chamfer width W24 of the chamfered portion in the edge portion on the circumferential narrow groove side of the first land portion is in a range $0.03 \leq W24/Wb2 \leq 0.13$ with respect to a maximum ground contact width Wb2 of the first land portion.

11. The tire according to claim 1, wherein an overlap Ld of the chamfered portion of the first land portion and the chamfered portion of the second land portion in a tire circumferential direction has a relationship $0.15 \leq Ld/Ps \leq 0.35$ with respect to a pitch length Ps of a zigzag shape of the circumferential narrow groove.

12. The tire according to claim 1, wherein a maximum chamfer width W33 of the chamfered portion of the second land portion is in a range $0.10 \leq W33/Wb3 \leq 0.25$ with respect to a maximum ground contact width Wb3 of the second land portion.

13. The tire according to claim 1, wherein the circumferential narrow groove has a zigzag shape made by alternately connecting a long portion and a short portion.

14. The tire according to claim 13, wherein the long portion of the circumferential narrow groove has an arc shape that projects toward the tire equatorial plane side.

15. The tire according to claim 13, wherein an amplitude As of the circumferential narrow groove is in a range $0.10 \leq As/Wb2 \leq 0.50$ with respect to a maximum ground contact width Wb2 of the first land portion.

16. The tire according to claim 13, wherein the circumferential length L33 of the chamfered portion of the second land portion in the edge portion on the circumferential narrow groove side has a relationship $0.20 \leq L33/Ps \leq 0.60$ with respect to the pitch length Ps of the zigzag shape of the circumferential narrow groove.

17. The tire according to claim 1, wherein the circumferential narrow groove has a zigzag shape made by alternately connecting a long portion and a short portion, the second land portion is a rib comprising a continuous road contact surface in a tire circumferential direction when the tire comes into contact with a ground, and the chamfered portion of the second land portion is formed in a region comprising a maximum amplitude position toward a tire ground contact edge side of the zigzag shape of the circumferential narrow groove.

18. A tire, comprising:
a circumferential narrow groove disposed in a tread portion center region and having a groove width of 0.5 mm or more and 2.5 mm or less; and
a first land portion defined by the circumferential narrow groove and a second land portion located further on a tire equatorial plane side than the first land portion and adjacent to the first land portion;
each of the first land portion and the second land portion comprising a chamfered portion in an edge portion on a circumferential narrow groove side,
a circumferential length L33 of the chamfered portion of the second land portion having a relationship L33<L24 with respect to a circumferential length L24 of the chamfered portion of the first land portion,
the circumferential narrow groove having a zigzag shape made by alternately connecting a long portion inclined in one direction with respect to the tire circumferential direction and a short portion inclined in an other direction with respect to the tire circumferential direction,
the first land portion comprising a plurality of lug grooves that extend at an incline with respect to a tire circumferential direction and that extend through the first land portion and a plurality of blocks each defined by the lug grooves adjacent to each other, and
the lug grooves of the first land portion each including an end portion connected to a maximum amplitude position toward the tire ground contact edge side of the zigzag shape of the circumferential narrow groove.

19. The tire according to claim 18, wherein the second land portion includes a plurality of center sipes having a maximum width W31 of less than 1.5 mm, and an end portion of each of the center sipes is connected to a maximum amplitude position toward the tire equatorial plane side of the zigzag shapes of the circumferential narrow groove.

20. A tire, comprising:
a circumferential narrow groove disposed in a tread portion center region and having a groove width of 0.5 mm or more and 3.0 mm or less; and
a first land portion defined by the circumferential narrow groove and a second land portion located further on a tire equatorial plane side than the first land portion and adjacent to the first land portion;
each of the first land portion and the second land portion comprising a chamfered portion in an edge portion on a circumferential narrow groove side,
a circumferential length L33 of the chamfered portion of the second land portion having a relationship L33<L24 with respect to a circumferential length L24 of the chamfered portion of the first land portion,
the circumferential narrow groove having a zigzag shape made by alternately connecting a long portion inclined in one direction with respect to the tire circumferential direction and a short portion inclined in an other direction with respect to the tire circumferential direction, the second land portion being a rib comprising a continuous road contact surface in a tire circumferential direction when the tire comes into contact with a ground, and the second land portion including a plurality of center sipes extending in the tire width direction, extending through the second land portion and having a maximum width W31 of less than 1.5 mm, wherein an end portion of each of the center sipes is connected to a maximum amplitude position toward the tire equatorial plane side of the zigzag shapes of the circumferential narrow groove.

21. A tire, comprising:

a circumferential narrow groove disposed in a tread portion center region and having a groove width of 0.5 mm or more and 3.0 mm or less; and a first land portion defined by the circumferential narrow groove and a second land portion located further on a tire equatorial plane side than the first land portion and adjacent to the first land portion;

each of the first land portion and the second land portion comprising a chamfered portion in an edge portion on a circumferential narrow groove side, a circumferential length L33 of the chamfered portion of the second land portion having a relationship L33<L24 with respect to a circumferential length L24 of the chamfered portion of the first land portion, the circumferential narrow groove having a zigzag shape made by alternately connecting a long portion and a short portion, the circumferential length L24 of the chamfered portion of the first land portion in an edge portion on the circumferential narrow groove side having a relationship $0.70 \leq L24/Ps$ with respect to a pitch length Ps of the zigzag shape of the circumferential narrow groove, and the circumferential length L33 of the chamfered portion of the second land portion in the edge portion on the circumferential narrow groove side having a relationship $0.20 \leq L33/Ps \leq 0.60$ with respect to the pitch length Ps of the zigzag shape of the circumferential narrow groove.

22. The tire according to claim 21, wherein an overlap Ld of the chamfered portion of the first land portion and the chamfered portion of the second land portion in a tire circumferential direction has a relationship $0.15 \leq Ld/Ps \leq 0.35$ with respect to a pitch length Ps of a zigzag shape of the circumferential narrow groove.

* * * * *